United States Patent
Kim et al.

(10) Patent No.: US 12,325,332 B2
(45) Date of Patent: Jun. 10, 2025

(54) APPARATUS FOR MOVING MOTOR-OPERATED SEAT RAIL

(71) Applicant: HYUNDAI TRANSYS INC., Seosan-si (KR)

(72) Inventors: Gyong Min Kim, Hwaseong-si (KR); In Gul Baek, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 191 days.

(21) Appl. No.: 17/811,507

(22) Filed: Jul. 8, 2022

(65) Prior Publication Data
US 2023/0014786 A1    Jan. 19, 2023

(30) Foreign Application Priority Data
Jul. 13, 2021    (KR) ........................ 10-2021-0091483

(51) Int. Cl.
*B60N 2/06*    (2006.01)
*B60N 2/02*    (2006.01)
*B60N 2/07*    (2006.01)

(52) U.S. Cl.
CPC ......... *B60N 2/02246* (2023.08); *B60N 2/067* (2013.01); *B60N 2/02253* (2023.08)

(58) Field of Classification Search
CPC ............ B60N 2/02246; B60N 2/02253; B60N 2/067; E05F 15/652; A47B 88/457
See application file for complete search history.

(56) References Cited

U.S. PATENT DOCUMENTS

| | | | |
|---|---|---|---|
| 2018/0215287 A1 | 8/2018 | Koop et al. | |
| 2021/0053467 A1* | 2/2021 | Aktas | B60N 2/0732 |
| 2021/0053468 A1 | 2/2021 | Aktas et al. | |
| 2021/0394647 A1* | 12/2021 | Shim | B60N 2/067 |
| 2022/0048409 A1* | 2/2022 | Sprenger | B60N 2/067 |

FOREIGN PATENT DOCUMENTS

| | | |
|---|---|---|
| EP | 4 052 959 A1 | 9/2022 |
| JP | 2013159229 A | 8/2013 |
| JP | 6098276 B2 | 3/2017 |
| JP | 202044858 A | 3/2020 |
| KR | 1020100095173 A | 8/2010 |
| KR | 10-1034307 | 5/2011 |
| KR | 1020180080407 | 7/2018 |

OTHER PUBLICATIONS

Korean Office Action dated Oct. 18, 2022; Appln. No. 10-2021-0091483.
European Search Report and its Opinion dated Nov. 28, 2022; EP22184341.0.
EPO Communication dated Oct. 21, 2024; Appln. No. 22 184 341.0.

* cited by examiner

*Primary Examiner* — Daniel J Colilla

(57) ABSTRACT

Disclosed is an apparatus for moving a motor-operated seat rail, the apparatus including a lower rail coupled to a vehicle body and located on a lower surface of a floor, an upper rail configured to integrally move with a seat along the lower rail, a lead screw located inside the lower rail, a drive unit located in the upper rail, a gear box located in the lead screw, the gear box receiving driving force from the drive unit to integrally move with the upper rail along the lead screw, and a drive transmission unit located between the drive unit and the gear box.

6 Claims, 5 Drawing Sheets

APPARATUS FOR MOVING MOTOR-OPERATED SEAT RAIL

This application claims the benefit of Korean Patent Application No. 10-2021-0091483, filed on Jul. 13, 2021, the entireties of which are incorporated herein by reference.

BACKGROUND

(a) Technical Field

The present disclosure relates to an apparatus for moving a motor-operated seat rail. More particularly, it relates to an apparatus for moving a motor-operated seat rail configured to easily transmit driving force of a drive unit located on an upper rail to a lower rail when the lower rail is located on a lower surface of a floor.

(b) Background Art

In general, a seat of a vehicle is mounted to be slidable forwards and backwards of a vehicle body, and this slidable movement thereof is performed by a seat rail.

The seat rail is formed of a lower rail coupled to a floor panel in the vehicle interior, and an upper rail coupled to a seat cushion frame and installed to move in the longitudinal direction of the lower rail.

Here, examples of a method of moving the upper rail in the forward-and-rearward direction of the vehicle body include a manual type in which the upper rail is moved in response to hand operation of a lever, and a motor-operated type in which the same is moved by receiving power from an electric motor in response to simple operation of a button.

Meanwhile, among components of the motor-operated type, a lead screw installed in the longitudinal direction of the seat rail is used as an essential component. In the related art, the lead screw is directly rotated by receiving power from a motor, thereby moving the upper rail.

However, when the lower rail protrudes from an upper surface of the floor in the related art, there is a problem in that foreign substances accumulate on the lower rail. Further, in recent years, efforts have been continuously made to expand movement of the seat in the longitudinal direction of the vehicle body and to reduce a configuration in which the lower rail protrudes from the upper surface of the floor. However, in this case, it is difficult to transmit driving force between the upper rail and the lower rail.

The above information disclosed in this Background section is only for enhancement of understanding of the background of the invention, and therefore it may contain information that does not form the prior art that is already known in this country to a person of ordinary skill in the art.

SUMMARY OF THE DISCLOSURE

The present invention has been made in an effort to solve the above-described problems associated with the prior art, and it is an object of the present invention to provide an apparatus for moving a motor-operated seat rail, the apparatus including a lower rail located on a lower surface of a floor, and a drive transmission unit coupled to an upper rail and the lower rail and configured to transmit driving force from the upper rail to the lower rail.

Further, it is another object of the present invention to provide various coupling relationships between components in which the driving force is transmitted between the lower rail and the upper rail.

The objects of the present invention are not limited to the above-mentioned object, and other objects not yet mentioned will be clearly understood by the following embodiments. Further, the objects of the present invention may be realized by features, operations, and components indicated in the claims, and combinations thereof.

In one aspect, the present invention provides an apparatus for moving a motor-operated seat rail, the apparatus including a lower rail coupled to a vehicle body and located on a lower surface of a floor, an upper rail configured to integrally move with a seat along the lower rail, a lead screw located inside the lower rail, a drive unit located in the upper rail, a gear box located in the lead screw, the gear box receiving driving force from the drive unit to integrally move with the upper rail along the lead screw, and a drive transmission unit located between the drive unit and the gear box.

In a preferred embodiment, the drive transmission unit may include a rotation unit configured to extend from a rotation shaft of the drive unit to be coupled to the gearbox.

In another preferred embodiment, the drive transmission unit may include a vertical gear unit configured to extend perpendicularly to a rotation shaft of the drive unit to be coupled to the gear box.

In still another preferred embodiment, the drive transmission unit may include a belt unit located between a rotation shaft of the drive unit and the gear box.

In yet another preferred embodiment, the upper rail may be configured to move along an upper surface of the floor.

In still yet another preferred embodiment, the drive transmission unit may be located between the upper rail and the lower rail along a slit located in the floor.

Other aspects and preferred embodiments of the invention are discussed infra.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
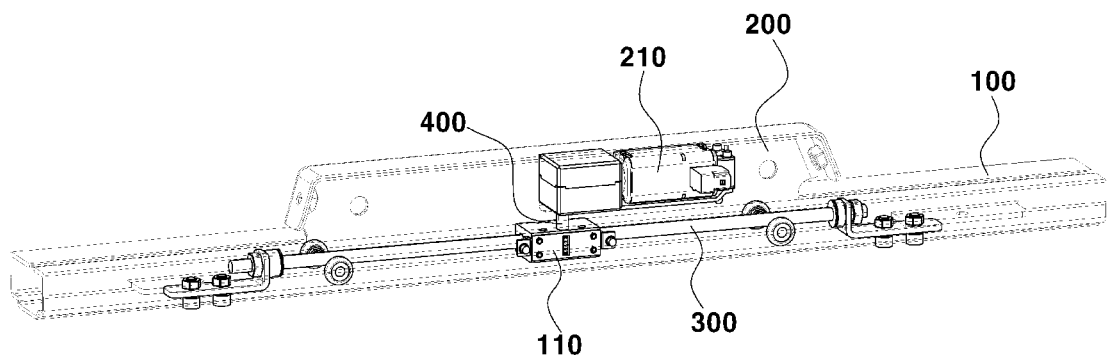
FIG. 1 shows a coupling diagram of an apparatus for moving a motor-operated seat rail according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. The embodiments are provided to more clearly explain the present invention to those of ordinary skill in the art.

In addition, terms such as "unit", "box", "rail", and the like described in the specification mean a unit that processes at least one function or operation, and this function or operation may be implemented by hardware or software or a combination of hardware and software.

Hereinafter, embodiments will be described in detail with reference to the accompanying drawings. Here, the same or corresponding components will be denoted by the same reference numerals, and redundant descriptions thereof will be omitted.

The present invention relates to an apparatus for moving a motor-operated seat rail, and relates to driving between upper rails 200, installed parallel to each other under a seat cushion so as to perform movement in the longitudinal direction of a seat, and lower rails 100, each of which is located at a corresponding one of the lower ends of the upper rails 200. The upper rail 200 and the lower rail 100 may be configured in pairs parallel to each other, and may be configured to set the movement direction of the seat.

Figure 2:
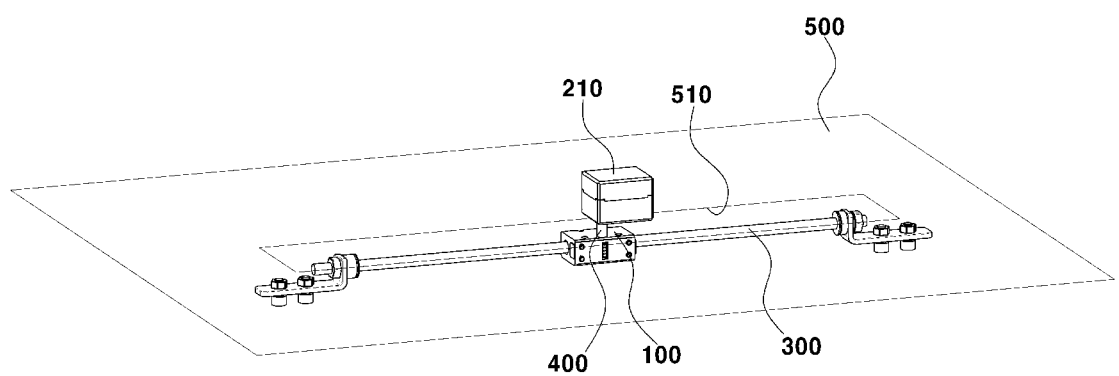
FIG. 2 is a view showing a configuration of the apparatus for moving the motor-operated seat rail according to the embodiment of the present invention.

FIGS. 1 and 2 show a configuration of the apparatus for moving the motor-operated seat rail according to the embodiment of the present invention.

The pair of lower rails 100 are configured to correspond to each other in the longitudinal direction of a vehicle, the pair of lower rails 100 being fixedly coupled to a vehicle body and being located on the lower surface of a floor 500. The apparatus for moving the motor-operated seat rail includes a lead screw 300 located inside the lower rail 100. The lead screw 300 may be located inside the lower rail 100 and each of the opposite ends thereof may be fixed by a mounting bracket.

The upper rail 200 located on the upper surface of the lower rail 100 is configured to be fixed to the seat cushion. Further, the lower end of the upper rail 200 is configured to be coupled to the lower rail 100, and preferably, the lower end of the upper rail 200 is connected to a gearbox 110 coupled to the lead screw 300. The gearbox 110 is configured to move along the lead screw 300 by driving force of a drive unit 210 located in the upper rail 200. Here, the gearbox 110, the upper rail 200, and the seat are integrally configured to move along the longitudinal direction of the lower rail 100.

More preferably, according to the embodiment of the present invention, the upper rail 200 may be configured in the form of a long rail so as to move from 500 mm to 1000 mm in the longitudinal direction of the vehicle, and is configured to be located on the upper surface of the floor.

A drive transmission unit 400 is provided between the drive unit 210 and the gearbox 110. Here, the drive transmission unit 400 may be formed in the height direction between the upper rail 200 and the lower rail 10. In the embodiment of the present invention, the drive transmission unit 400 is configured to be horizontal with respect to the height direction so that the same is located between the drive unit 210 and the gearbox 110.

In the embodiment of the present invention, the drive unit 210 located in the upper rail 200 may be located in an upper housing, and the gearbox 110 may include an independent housing. Alternatively, in another embodiment of the present invention, the drive unit 210 and the gearbox 110 may be configured to include one integrated housing.

The drive transmission unit 400 is configured to pass through the floor 500 in the vehicle interior, and the floor 500 includes a slit 510 formed along a movement path of the upper rail 200. Therefore, the drive transmission unit 400 is configured to pass through the slit 510 to be located between the upper rail 200 and the lower rail 100, and is configured to move along the slit 510 when the upper rail 200 moves. The drive transmission unit 400 may have opposite ends thereof, each of which is coupled to a corresponding one of the drive unit 210 located in the upper housing and the gearbox 110. Further, the drive transmission unit 400 may be configured to be surrounded by an integrated housing configured to surround the drive unit 210 and the gearbox 110.

The upper end of the drive transmission unit 400 is coupled to the drive unit 210 located in the upper rail 200, and the lower end thereof is coupled to the gearbox 110, and as such, driving force applied from the drive unit 210 is transmitted to the gearbox 110 via the drive transmission unit 400.

The drive unit 210 may include a motor formed therein. Here, depending on a coupling relationship between the drive unit 210 and the drive transmission unit 400, a rotation shaft 220 of the drive unit 210 may be located in the horizontal direction or the vertical direction with respect to the drive transmission unit 400. According to the embodiment of the present invention, when the motor rotation shaft 220 of the drive unit 210 is formed in the height direction, the drive transmission unit 400 may be integrally coupled to the rotation shaft 220 in the form of a steel shaft. According to another embodiment, when the motor rotation shaft 220 of the drive unit 210 is disposed in a state of being perpendicular to the height direction, the drive transmission unit 400 may be coupled to a worm wheel gear 230 located at one end of the rotation shaft 220 of the drive unit 210 to change the movement direction so that the rotation shaft 220 of the drive unit 210 is rotated with respect to a central axis in the height direction.

The other end of the drive transmission unit 400 may be configured to be coupled to a worm wheel nut 120. Here, the worm wheel nut 120 is located inside the gearbox 110 and is configured to surround the outer circumferential surface of the lead screw 300. More preferably, the worm wheel nut 120 receives rotational force of the drive unit 210 from the drive transmission unit 400 and is configured to move along a thread formed on the outer circumferential surface of the lead screw 300. That is, the other end of the drive transmission unit 400 is located inside the gearbox 110 and is coupled to the worm wheel nut 120 corresponding to the lead screw 300, thereby transmitting the rotational force of the drive unit 210. Further, the gearbox 110, having the worm wheel nut 120 therein, may include a housing configured to surround the worm wheel nut 120, thereby preventing damage to the gearbox 110.

According to the embodiment of the present invention, the housing may be formed of an upper housing and a lower housing, and the lead screw 300 may be configured to extend in the longitudinal direction while passing through the housing. Further, the upper housing and the lower housing may be fixedly coupled to each other using a bolt.

A control unit (not shown) is configured to apply the rotational force of the drive unit 210 in response to a request from a user, thereby controlling movement of the seat in the longitudinal direction. The control unit may be an individual control unit located in the seat, or may be an integrated control unit located in the vehicle.

Figure 3:
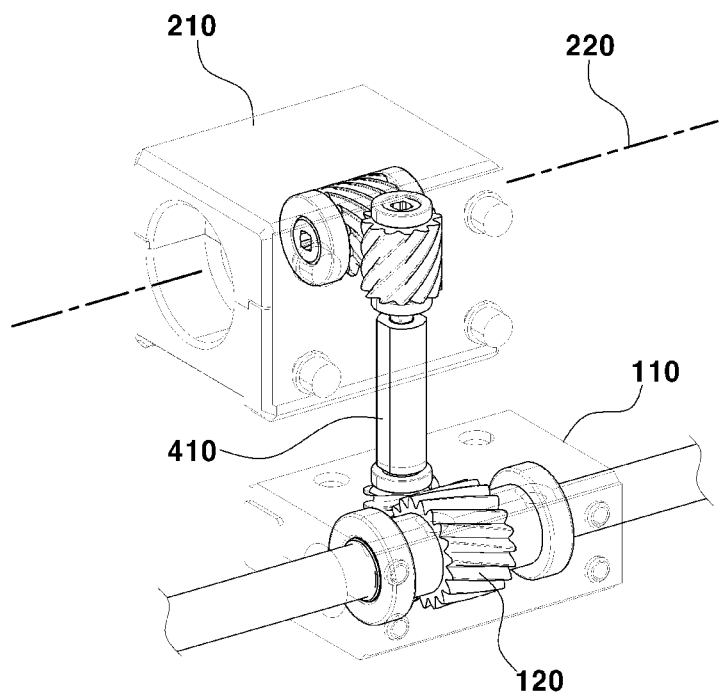
FIG. 3 is a view showing a drive transmission unit of the apparatus for moving the motor-operated seat rail according to the embodiment of the present invention.

FIG. 3 is a view showing a configuration of a rotation unit 410 serving as the drive transmission unit 400, the rotation unit 410 being coupled to the rotation shaft 220 of the drive unit 210 according to the embodiment of the present invention.

As shown in the drawing, the drive unit 210 is configured to be surrounded by the upper housing, and the rotation unit 410 serving as the drive transmission unit 400 is configured to pass through the gearbox 110 and the upper housing, respectively, to be coupled to the same. The rotation unit 410 serving as the drive transmission unit 400 has one end thereof coupled to the worm wheel gear 230 located in the rotation shaft 220 of the drive unit 210, and the other end thereof coupled to the worm wheel nut 120 located inside the gearbox 110. More preferably, the drive transmission unit 400 is configured to contact the outer surface of the worm wheel nut 120, and the gearbox 110 is configured to move along the lead screw 300 according to the rotation of the worm wheel nut 120.

Figure 4:
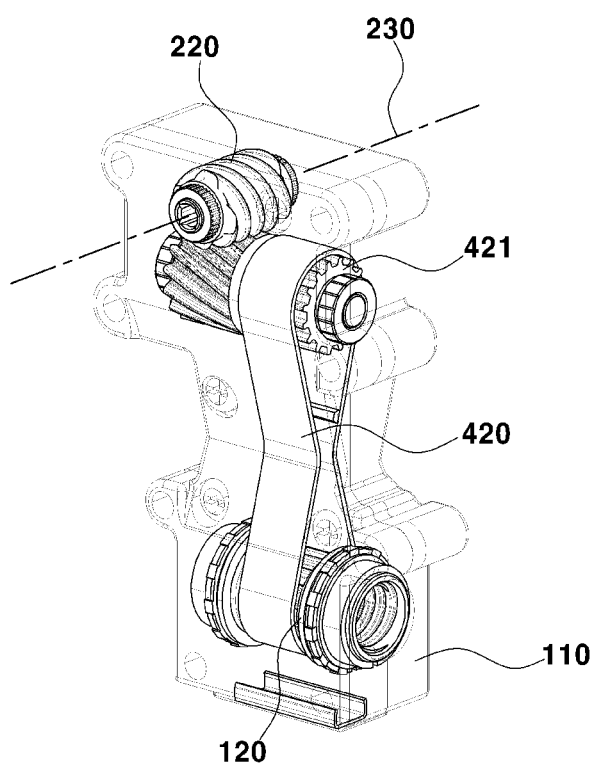
FIG. 4 is a view showing a drive transmission unit of an apparatus for moving a motor-operated seat rail according to another embodiment of the present invention.

Meanwhile, FIG. 4 is a view showing a belt unit 420 serving as the drive transmission unit 400 according to another embodiment of the present invention.

As shown in the drawing, the drive unit 210, the gearbox 110, and the belt unit 420 may be configured to be surrounded by one integrated housing. Further, the drive transmission unit 400 located between the rotation shaft 220 of the drive unit 210 and the gearbox 110 is formed as the belt unit 420. Here, the belt unit 420 is coupled to each of a rotation member 421 of the rotation shaft 220 of the drive unit 210 and the worm wheel nut 120 located in the gearbox 110. The belt unit 420 may be made of a rubber material or a flexible cable, and may be configured to apply rotational force between the rotation member 421 and the gearbox 110. Additionally, the belt unit 420 is configured to move the gearbox 110 along the lead screw 300 according to bidirectional rotation of the rotation member 421.

The rotation member 421 coupled to the rotation shaft 220 of the drive unit 210 may be configured to have a predetermined angle with the rotation shaft 220 on the same plane. More preferably, the rotation member 421 may be configured to form an angle with the rotation shaft 220 so as to have a rotation surface facing in the same direction as the worm wheel nut 120. Accordingly, the belt unit 420 may be configured to rotate the rotation member 421 and the worm wheel nut 120 while maintaining a predetermined tension.

Figure 5:
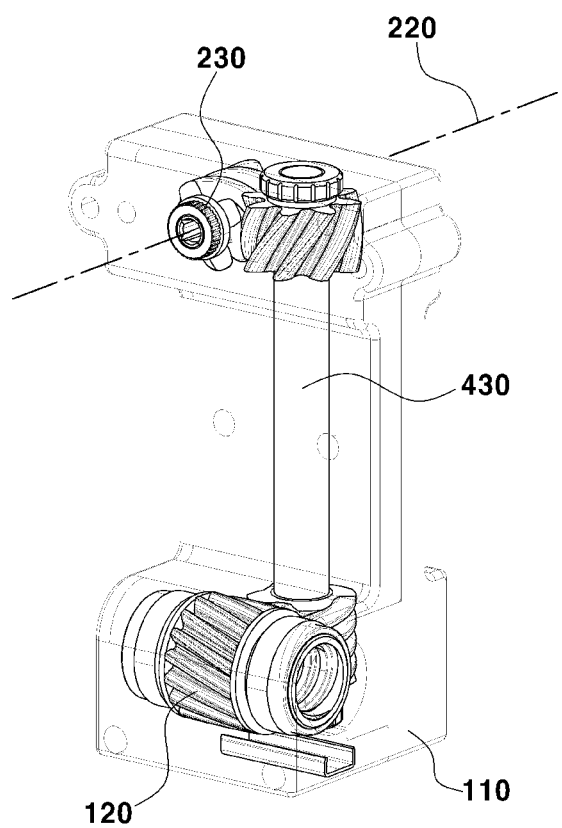
FIG. 5 is a view showing a drive transmission unit of an apparatus for moving a motor-operated seat rail according to still another embodiment of the present invention.

FIG. 5 is a view showing a configuration of a vertical gear unit 430 in which the drive transmission unit 400 is formed of a steel shaft according to still another embodiment of the present invention.

The vertical gear unit 430 serving as the drive transmission unit 400 is formed of the steel shaft. The vertical gear unit 430 has one end thereof coupled to the worm wheel gear 230 of the drive unit 210, and other end thereof coupled to the worm wheel nut 120 inside the gear box 110. Additionally, the rotation shaft 220 of the drive unit 210 is located perpendicular to the drive transmission unit 400, and rotational force of the drive transmission unit 400 is transmitted to the worm wheel nut 120 through the worm wheel gear 230.

Accordingly, the vertical gear unit 430 is coupled to the worm wheel gear 230 and the worm wheel nut 120, respectively, and the gearbox 110 is configured to move along the lead screw 300 according to the rotational force of the drive unit 210. In summary, the present invention provides an apparatus for moving a motor-operated seat rail configured to couple the upper rail 200, located on the upper surface of the floor 500, to the lower rail 100, fixed to a vehicle body and located on the lower surface of the floor 500, and to transmit the driving force of the drive unit 210 located in the upper rail 200 to the gearbox 110 in the lower rail 100 through various drive transmission units 400.

Figure 6:
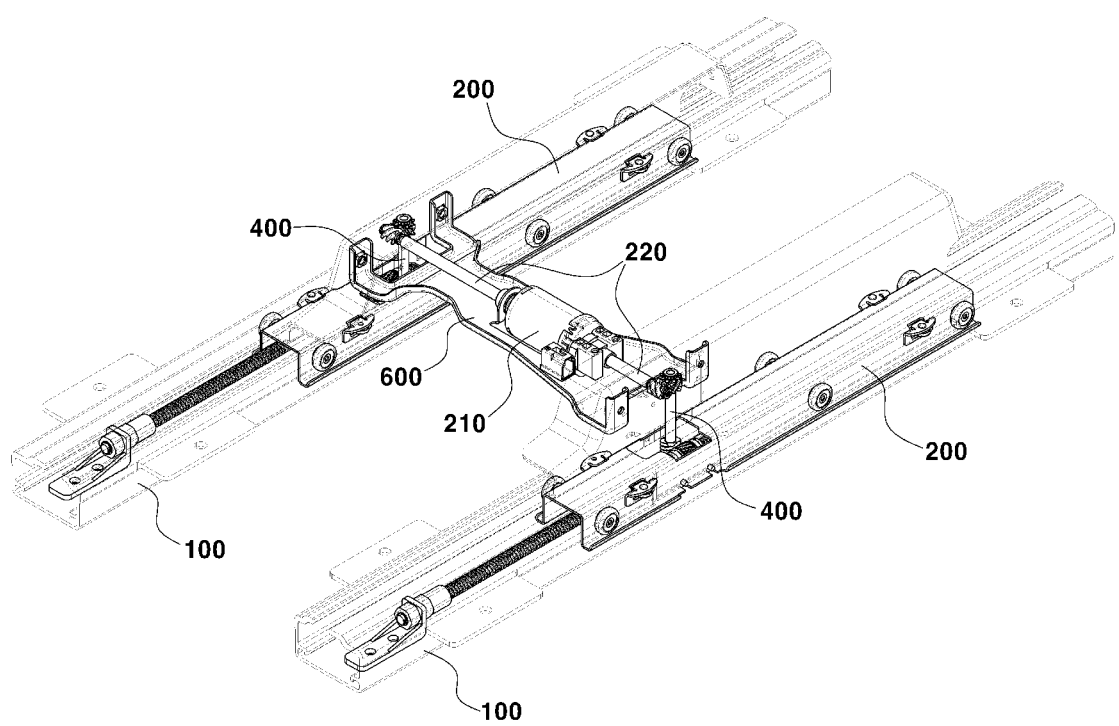
FIG. 6 is a view showing an apparatus for moving a motor-operated seat rail including a single drive unit located on a pair of rails according to the embodiment of the present invention.

FIG. 6 is a view showing the drive unit 210 including a single motor located between a pair of upper rails 200 configured to correspond to each other according to the embodiment of the present invention.

The drive unit 210 including the single motor is configured to be fixed between the pair of upper rails 200, and to simultaneously transmit rotational force of the single motor to the upper rails 200, each of which is located at a corresponding one of opposite ends of the drive unit 210.

The drive unit 210 is configured to extend a rotation shaft thereof along the width between the pair of upper rails 200 so that the rotational force thereof is transmitted to the worm wheel gear 230 located in the upper rail 200. Alternatively, the drive unit 210 may be configured to be coupled to a separate rotation shaft 220 to transmit the rotational force thereof to each of the worm wheel gears 230 located at the opposite ends of the upper rails 200. More preferably, the configuration of transmitting the rotational force of the drive unit 210 to the worm wheel gear 230 is not limited thereto.

The drive unit 210 is fixed to a bracket 600 located between the pair of upper rails 200, and the bracket 600 may include a driving rotation shaft configured to transmit the rotational force of the drive unit 210 to each of the opposite ends of the pair of upper rails 200.

In this manner, the driving force transmitted to each of the opposite ends of the pair of upper rails 200 is applied to the lower rail 100 through the drive transmission unit 400, thereby enabling the seat to move along the slit 510 of the floor 500. The drive transmission unit 400 may be configured as one of the rotation unit 410, the belt unit 420, and the vertical gear unit 430.

Accordingly, the drive unit 210 including the single motor may be located between the pair of upper rails 200 to drive forward-and-rearward movement of the seat.

As is apparent from the above description, the present invention may obtain the following effects by the configuration, combination, and use relationship described in the embodiments.

The present invention has an effect of providing an apparatus for moving a motor-operated seat rail capable of transmitting driving force to a lower rail located on a lower surface of a floor.

In addition, the lower rail located on the lower surface of the floor is provided, thereby having an effect of preventing foreign substances from accumulating on the lower rail.

The invention has been described in detail with reference to preferred embodiments thereof. However, it will be appreciated by those skilled in the art that various alternatives, modifications, equivalents and other embodiments may be made in these embodiments without departing from the principles and spirit of the invention, the scope of which is defined in the appended claims and equivalents thereto. The embodiments herein describe the best mode of implementing the technical idea of the present invention, and various modifications required in the specific application field and use of the present invention are also possible. Therefore, it will be understood that the detailed description of the present invention is not intended to limit the present invention to the disclosed embodiments. Further, the appended claims should be construed as including other embodiments.

What is claimed is:

1. An apparatus for moving a motor-operated seat rail, the apparatus comprising:
   a lower rail coupled to a vehicle body and located on a lower surface of a floor;
   an upper rail configured to integrally move with a seat along the lower rail;
   a lead screw located inside the lower rail;
   a drive unit located in the upper rail;
   a gear box located in the lead screw, the gear box receiving driving force from the drive unit to integrally move with the upper rail along the lead screw; and
   a drive transmission unit located between the drive unit and the gear box,
   wherein the drive transmission unit comprises a vertical gear unit configured to face a rotation shaft of the drive unit and to extend in a height direction thereof to be coupled to the gear box.

2. The apparatus of claim 1, wherein the drive transmission unit comprises a rotation unit configured to extend from a rotation shaft of the drive unit to be coupled to the gearbox.

3. The apparatus of claim 1, wherein the drive transmission unit comprises a belt unit located between a rotation shaft of the drive unit and the gear box.

4. The apparatus of claim 1, wherein the upper rail is configured to move along an upper surface of the floor.

5. The apparatus of claim 1, wherein the drive transmission unit is located between the upper rail and the lower rail along a slit located in the floor.

6. An apparatus for moving a motor-operated seat rail, the apparatus comprising:
   a first lower rail coupled to a vehicle body and located on a lower surface of a floor,
      a first upper rail configured to integrally move with a seat along the first lower rail,
      a first lead screw located inside the first lower rail,
      a first gear box located in the first lead screw, the first gear box receiving driving force from a drive unit to integrally move with the first upper rail along the first lead screw, and
      a first drive transmission unit located between the drive unit and the gear box,
      wherein the first drive transmission unit comprises a first vertical gear unit configured to face a first rotation shaft of the drive unit and to extend in a height direction thereof to be coupled to the first gear box; and
   a second lower rail coupled to the vehicle body and located on the lower surface of the floor,
      a second upper rail configured to integrally move with the seat along the second lower rail,
      a second lead screw located inside the second lower rail,
      a second gear box located in the second lead screw, the second gear box receiving driving force from the drive unit to integrally move with the second upper rail along the second lead screw, and
      a second drive transmission unit located between the drive unit and the gear box,
      wherein the second drive transmission unit comprises a second vertical gear unit configured to face a second rotation shaft of the drive unit and to extend in a height direction thereof to be coupled to the second gear box;
   wherein the drive unit is located between the first upper rail and the second upper rail, the first upper rail being located on a left side of the drive unit and the second upper rail being located on a right side of the drive unit.

* * * * *